United States Patent
Chen et al.

(10) Patent No.: US 10,217,365 B2
(45) Date of Patent: Feb. 26, 2019

(54) METHOD FOR DETERMINING WHETHER OBJECT IS IN TARGET AREA, AND PARKING MANAGEMENT DEVICE

(71) Applicant: BEIJING MOBIKE TECHNOLOGY CO., LTD., Beijing (CN)

(72) Inventors: Chaochao Chen, Beijing (CN); Zirong Guo, Beijing (CN); Yujie Yang, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/796,208

(22) Filed: Oct. 27, 2017

(65) Prior Publication Data

US 2018/0315317 A1 Nov. 1, 2018

(30) Foreign Application Priority Data

Apr. 28, 2017 (CN) .......................... 2017 1 0296303

(51) Int. Cl.
| | |
|---|---|
| G08G 1/14 | (2006.01) |
| G08G 1/16 | (2006.01) |
| G06Q 30/02 | (2012.01) |
| G06Q 50/30 | (2012.01) |
| H04L 29/08 | (2006.01) |
| H04B 17/318 | (2015.01) |

(52) U.S. Cl.
CPC .............. *G08G 1/168* (2013.01); *G06Q 50/30* (2013.01); *G08G 1/14* (2013.01); *H04B 17/318* (2015.01); *G06Q 30/0284* (2013.01); *H04L 67/12* (2013.01)

(58) Field of Classification Search
CPC ....................................................... H04L 67/12
See application file for complete search history.

(56) References Cited

U.S. PATENT DOCUMENTS

| | | | | |
|---|---|---|---|---|
| 2004/0267521 | A1* | 12/2004 | Cutler | G10L 15/25 704/202 |
| 2006/0224367 | A1* | 10/2006 | Fukui | G01N 29/14 703/2 |
| 2017/0177954 | A1* | 6/2017 | Micks | G06K 9/209 |

FOREIGN PATENT DOCUMENTS

| | | |
|---|---|---|
| CN | 204614229 U | 9/2015 |
| CN | 105554878 A | 5/2016 |
| CN | 105554879 A | 5/2016 |
| JP | 2011-215745 A | 10/2011 |

* cited by examiner

*Primary Examiner* — Hsinchun Liao
(74) *Attorney, Agent, or Firm* — Hultquist, PLLC; Steven J. Hultquist

(57) ABSTRACT

The present disclosure relates to a method for determining whether an object is within a target area, a parking management device, a parking management system and an electronic device. The method comprises the following steps: acquiring an intensity value of a wireless signal that the object receives from a signal transmitting apparatus which is provided on the site of the target area; and determining whether the object is within the target area based on the intensity value of the wireless signal. The method for determining whether the object is within the target area can be applied to guide a user to park a vehicle within a parking area.

16 Claims, 3 Drawing Sheets

METHOD FOR DETERMINING WHETHER OBJECT IS IN TARGET AREA, AND PARKING MANAGEMENT DEVICE

CROSS-REFERENCE TO RELATED APPLICATION

This application claims priority under 35 USC § 119 to Chinese Application No. 201710296303.6 filed Apr. 28, 2017, the contents of which are hereby incorporated herein by reference in their entirety, for all purposes.

FIELD

The present disclosure relates to the field of vehicle management, and more particularly to a method for determining whether an object is within a target area, and a parking management device.

BACKGROUND

The sharing economy has become a trend in the development of times, and there are various public vehicles appearing in life, such as public bicycles funded by the government as well as public bicycles, tricycles, electric vehicles and cars operated by enterprises.

In the management of shared vehicles, parking management has always been a problem. For a shared vehicle service provider, it is necessary to provide a standard parking area on the ground, and to remind the user who does not park as required, so as to guide the user to park normatively. In the prior art, the parking of public vehicles is managed generally through parking piles, but this method requires one parking pile for each parking space, and the cost is relatively high.

SUMMARY

An objective of the present disclosure is to provide a method to determine whether an object is within a target area for managing vehicle parking.

According to the first embodiment of the present disclosure, there is provided a method for determining whether an object is within a target area. The method comprises the following steps: acquiring an intensity value of a wireless signal that the object receives from a signal transmitting apparatus provided on the site of the target area; and determining whether the object is within the target area based on the intensity value of the wireless signal.

Optionally, the wireless signal contains an identifier of the signal transmitting apparatus. Whether the object is within the target area is determined based on a combination of the intensity value of the wireless signal and the identifier corresponding to the wireless signal.

Optionally, the target area is circular, the signal transmitting apparatus is provided in the center of the target area, and the signal transmitted from the apparatus covers the target area.

Optionally, any location within the target area is covered by the signals transmitted from at least two wireless transmitting apparatuses. The intensity values of N wireless signals that the object receives from different signal transmitting apparatuses are acquired, in which N≥2. Whether the object is within the target area is determined based on the intensity values of the N wireless signals or based on a combination of the intensity values of the N wireless signals and the identifiers corresponding to the wireless signals.

Optionally, the N wireless signals are the N ones having the strongest intensity among the wireless signals that the object receives from the different signal transmitting apparatuses.

Optionally, the signal transmitting apparatuses are provided on the corners of the target area respectively.

Optionally, the target area is in a shape of a rectangle, and the signal transmitting apparatuses are uniformly provided on center lines of the rectangle, the center line being a connection line of midpoints of two opposite sides of the rectangle.

Optionally, whether the object is within the target area is determined based on a judgment model, wherein the judgment model is trained in advance by using positive sample data and negative sample data, the positive sample data comprising the intensity values of wireless signals acquired from objects at various positions within the target area, and the negative sample data comprising the intensity values of wireless signals acquired by objects at various positions outside the target area.

Optionally, whether the object is within the target area is determined based on a judgment model, wherein the judgment model is trained in advance by using positive sample data and negative sample data, the positive sample data comprising a combination of the intensity values of wireless signals acquired by objects at various positions within the target area and identifiers corresponding to the wireless signals, and the negative sample data comprising a combination of the intensity values of wireless signals acquired by objects at various position outside the target area and identifiers corresponding to the wireless signals.

Optionally, the object is a vehicle, and the target area is a parking area.

Optionally, a prompt message about vehicle parking is provided when the vehicle is not in the parking area.

According to the second embodiment of the present disclosure, there is provided a parking management device, which comprises a data acquisition unit and a judgment unit, wherein the data acquisition unit is used for acquiring an intensity value of a wireless signal received by a vehicle from a signal transmitting apparatus provided on the site of a parking area; and the judging unit is used for determining whether the vehicle is in the parking area based on the intensity value of the wireless signal.

Optionally, the wireless signal contains an identifier of the signal transmitting apparatus. The judgment unit is used for determining whether the object is within the target area based on a combination of the intensity value of the wireless signal and the identifier corresponding to the wireless signal.

Optionally, the data acquisition unit is used for acquiring the intensity values of N wireless signals received by the vehicle from different signal transmitting apparatuses, in which N≥2. The judgment unit is used for determining whether the vehicle is within the target area based on the intensity values of the N wireless signals or based on a combination of the intensity values of the N wireless signals and the identifiers corresponding to the wireless signals.

Optionally, the N wireless signals are the N ones having the strongest intensity among the wireless signals received by the vehicle from the different signal transmitting apparatuses.

Optionally, the judgment unit is used for determining the vehicle is in the parking area based on a judgment mode, wherein the judgment model is trained in advance by using positive sample data and negative sample data, the positive sample data comprising intensity values of wireless signals acquired from vehicles at various position within the parking area, and the negative sample data comprising intensity values of wireless signals acquired from vehicles at various positions outside the target area.

Optionally, the judgment unit is used for determining whether the vehicle is in the parking area based on a judgment model, wherein the judgment model is trained by using positive sample data and negative sample data in advance, the positive sample data comprising a combination of intensity values of wireless signals acquired from vehicles at various position within the target area and identifiers corresponding to the wireless signals, and the negative sample data comprising a combination of intensity values of wireless signals acquired from vehicles at various positions outside the target area and identifiers corresponding to the wireless signals.

Optionally, the parking management device further comprises a parking prompting unit which is used for providing a prompt message about vehicle parking when the vehicle is not in the parking area.

According to the third embodiment of the present disclosure, there is provided a parking management device, comprising a memory and a processor, wherein the memory is used for storing instructions, the instructions being used for controlling the processor to operate to execute any of the preceding methods for determining whether the object is within the target area.

Optionally, the parking management device is at least one of the vehicle, a mobile terminal and a server.

According to the method for determining whether the object is within the target area provided by the present innovation, whether the object is within the target area is determined directly using the intensity of the wireless signal received by the object, without performing positioning calculation on the object. Optionally, when applied to parking management, the method is more accurate and reliable compared to a method for performing parking management on a vehicle by way of GPS positioning, etc.

To make the above objects, features and advantages of the present disclosure become more apparent and easily understood, a detailed description of preferred embodiments will be made below in conjunction with the accompanying drawings.

BRIEF DESCRIPTION OF THE DRAWINGS

In order to illustrate the technical solution of the embodiments of the present disclosure more clearly, the following drawings, which are to be used in the embodiments are briefly described below. It is to be understood that the following drawings are only illustrative of certain embodiments of the present disclosure and should not be considered to limit the scope. For those skilled in the art, other related drawings may also be obtained according to these drawings without undue effort, based on the disclosure herein.

DETAILED DESCRIPTION OF THE EMBODIMENTS

Figure 1:
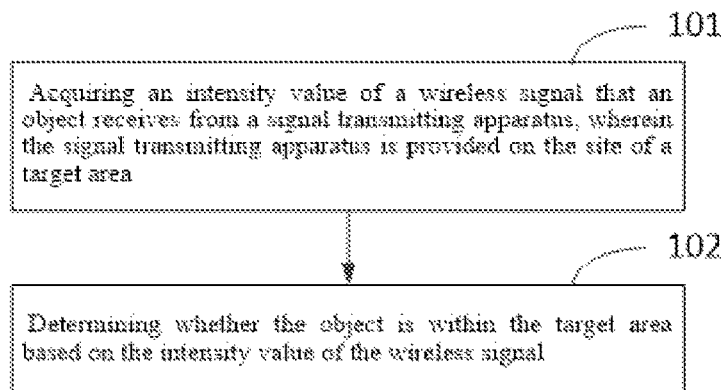
FIG. 1 illustrates a schematic flow diagram of a method for determining whether an object is within a target area provided by an embodiment of the present disclosure.

Various exemplary embodiments of the present disclosure will now be described in detail with reference to the accompanying drawings. It should be noted that the relative arrangement, numerical expressions and numerical values of the components and steps set forth in these embodiments do not limit the scope of the present disclosure unless otherwise specified.

The following description of at least one exemplary embodiment is in fact merely illustrative and is in no way intended as a limitation to the present disclosure and its application or use.

Techniques, methods, and devices known to those of ordinary skill in the relevant art may not be discussed in detail but where appropriate, the techniques, methods, and devices should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, there is no need for further discussion in the accompanying drawings.

<Overall Architecture of Shared Vehicle System>

Figure 9:
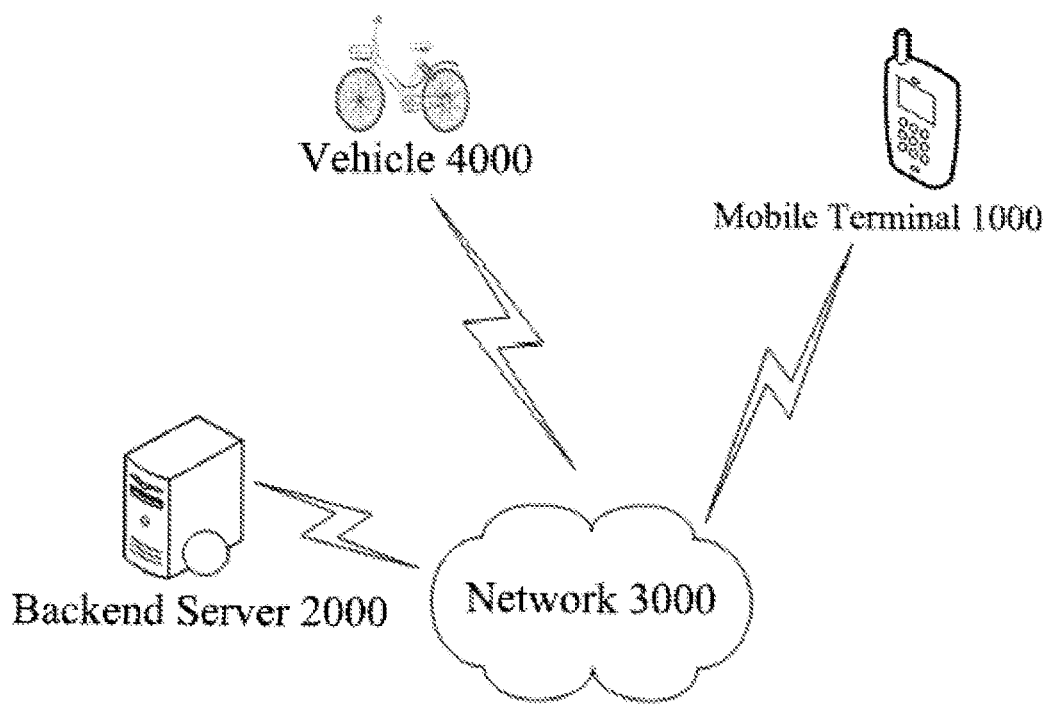
FIG. 9 is a schematic diagram of an overall architecture of a shared vehicle system of an embodiment of the present disclosure.

FIG. 9 illustrates a schematic diagram of an overall architecture of a shared vehicle system of an embodiment of the present disclosure.

As illustrated in FIG. 9, the shared vehicle system may include a mobile terminal 1000, a backend server 2000 and a vehicle 4000, which establish a communication connection with each other via a wireless network 3000.

The vehicle 4000 has a two-dimensional code and/or code for uniquely identifying the corresponding vehicle.

The user may scan the two-dimensional code on the vehicle 4000 via the mobile terminal 1000 and further transmit the two-dimensional code information to the backend server 2000 to perform an unlocking operation.

The user may also input or identify the code on the vehicle 4000 via the mobile terminal 1000 and further transmit the code information to the backend server 2000 to perform an unlocking operation.

When the user scans the two-dimensional code or inputs the code on the vehicle 4000 via the mobile terminal 1000, it is necessary to use the functions of the mobile terminal 1000, such as a flashlight function, a camera function and the like of the mobile terminal 1000.

In an embodiment of the present disclosure, the mobile terminal 1000 may transmit or receive a signal by such ways as a wired or wireless network, or may process or store the signal as a physical storage state, for example, in a memory. Each mobile terminal may be an electronic device that includes hardware, software or embedded logic components or a combination of two or more such components and is capable of performing appropriate functions implemented or supported by the mobile terminal. For example, the mobile terminal may be a smart phone, a tablet computer, a portable e-mail device, an electronic book, a handheld game machine and/or a game controller, a notebook computer, a netbook, a handheld electronic device, an intelligent wearable device, and the like. The present disclosure encompasses any appropriate mobile terminal. The mobile terminal may allow a user who uses the mobile terminal to access the network.

The mobile terminal 1000 may comprise a processing device including an application processing unit and a radio frequency/digital signal processor, and may also comprise ROM, RAM, a flash memory, or any combination thereof.

In addition, various client applications may be installed on the mobile terminal 1000 and used to allow the use of the mobile terminal 1000 to transmit commands suitable for operation with other devices. Such applications may be downloaded from the server and installed in the memory of the mobile terminal 1000, or may have been installed on the mobile terminal 1000 in advance. In an embodiment of the present disclosure, the mobile terminal 1000 is provided with a vehicle user terminal application which can assist the user in realizing the function of using the vehicle 4000.

In an embodiment of the present disclosure, the backend server 2000 is a server. The term "server" as used herein should be construed as a service point for providing processing, databases and communication facilities. For example, the server may refer to a single physical processor with associated communication and data storage and database facilities, or a collection of a networked or aggregated processor, an associated network and a storage device, and operate software and one or more database systems, as well as application software supporting services provided by the server. The server may vary greatly in configuration or performance. But the server may generally include one or more central processing units and a memory. The server further includes one or more mass storage devices, one or more power supplies, one or more wired or wireless network interfaces, one or more input/output interfaces, or one or more operating systems, such as Windows Server, Mac OS X, Unix, Linux and FreeBSD. Concretely, the backend server 2000 may be a monolithic server or a distributed server across multiple computers or a computer data center. The server may be of various types, such as, but not limited to, a web server, a news server, a mail server, a message server, an ad server, a file server, an application server, an interactive server, a database server, or a proxy server. In certain embodiments, each server may include hardware, software, or embedded logic components for performing appropriate functions supported or implemented by the server or a combination of two or more such components. In an embodiment of the present disclosure, the backend server 2000 is used to provide all the functions necessary to support the use of the vehicle.

In an embodiment of the present disclosure, the vehicle 4000 may be of various types, such as a bicycle or a tricycle, an electric moped, a motorcycle, and a four-wheel passenger vehicle.

In an embodiment of the present disclosure, the wireless network 3000 covers any suitable wireless network, such as, but not limited to, a 4G network, a 3G network, GPRS and Wi-Fi. In addition, the wireless network that couples the backend server 2000 and the mobile terminal 1000 together with the wireless network that couples the backend server 2000 and the vehicle 4000 may be the same wireless network or a different wireless network.

As illustrated in FIG. 1, a method for determining whether an object is within a target area provided by an embodiment of the present disclosure is described. The method comprises the following steps 101-102.

In the step 101, an intensity value of a wireless signal that the object receives from a signal transmitting apparatus is acquired, wherein the signal transmitting apparatus is provided on the site of the target area.

In the step 102, whether the object is within the target area is determined based on the intensity value of the wireless signal.

In an embodiment, the signal transmitting apparatuses are provided on the corners of the target area respectively.

In an embodiment, the target area is in a shape of a rectangle, and the signal transmitting apparatuses are uniformly provided on center lines of the rectangle, the center line being a connection line of midpoints of two opposite sides of the rectangle.

In an embodiment, the target region is a circular, and a signal transmitting apparatus is provided in the center of the target area, and the signal transmitted from the apparatus covers the target area. If the intensity value of the wireless signal that the object receives from the signal transmitting apparatus exceeds a preset threshold, it is judged that the object is within the target area, otherwise it is judged that the object is not in the target area.

In an embodiment, with respect to a plurality of signal transmitting apparatuses provided in one target area, any location within the target area is covered by the signals transmitted from at least two signal transmitting apparatuses. Each signal transmitting apparatus broadcasts a message to the periphery according to a certain period to form an electronic geo-fence that matches the target area. The intensity values of N wireless signals that the object receives from different signal transmitting apparatuses are acquired. Whether the object is within the target area is determined based on the intensity values of the N wireless signals, in which N≥2. Optionally, the N wireless signals are the N ones having the strongest intensity among the wireless signals that the object receives from the different signal transmitting apparatuses. If the object only receives the wireless signal from one signal transmitting apparatus, it is indicated that the object is not in the target area.

For example, four signal transmitting apparatuses are provided for a target area Z. The four signal transmitting apparatuses can be combined to realize the wireless coverage to the target area Z, and any location within the target areas Z is covered by the signals transmitted from at least two signal transmitting apparatuses. If the object receives wireless signals from the four signal transmitting apparatuses, respectively, which are the wireless signal X1 received from the first signal transmitting apparatus, the wireless signal X2 received from the second signal transmitting apparatus, the wireless signal X3 received from the third signal transmitting apparatus and the wireless signal X4 received from the fourth signal transmitting apparatus respectively, the two signals having the strongest signal intensity are selected from the wireless signals X1 to X4, and whether the object is within the target area is determined based on the intensity values of the two wireless signals.

In an embodiment, after the signal transmitting apparatuses are well provided in the target area, it is possible to establish a judgment model for the target area by way of machine learning and training, the judgment model taking the intensity value of the wireless signal received by the object as an input and whether the object is within the target area as an output. The judgment model of the target area is obtained by way of training through previously acquired positive sample data and negative sample data.

A group of positive sample data is acquired for each position within the target area. For an object at a certain position within the target area, a group of positive sample data includes the intensity values of various wireless signals acquired by the object, or a group of positive sample data includes the intensity values of the N wireless signals having the strongest intensity acquired by the object.

A group of negative sample data is acquired for each position outside the target area. For an object at a certain position outside the target area, a group of negative sample data includes the intensity values of various wireless signals acquired by the object, or a group of negative sample data includes the intensity values of the N wireless signals having the strongest intensity acquired by the object.

After the judgment model of the target area is formed, in the step 102, whether the object is within the target area can be determined based on the judgment model.

In general, if the arrangement circumstance of the signal transmitting apparatuses in the target area changes, for example, the positions of the signal transmitting apparatuses change, the original judgment model is no longer applicable to the target area, and it is necessary to re-train the target area and update the judgment model.

Figure 2:
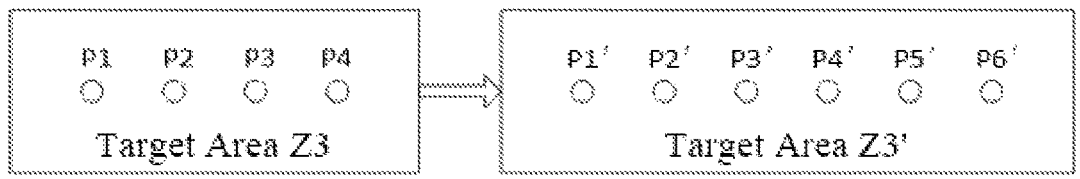
FIG. 2 illustrates a schematic diagram of a judgment model for training the target area provided by an embodiment of the present disclosure.

In some cases, as shown in FIG. 2, the target area Z3 is in a shape of a rectangle which has a length of 10 m and a width of 4 m. A signal transmitting apparatus is arranged every 2 m in a longitudinal direction, and four signal transmitting apparatuses P1, P2, P3, and P4 are arranged in total. The target area Z3 is trained to obtain a judgment model W. When the judgment model W is used to make a judgment, the intensity values of wireless signal that the object receives from the P1-P4 respectively are input. The target area Z3 is expanded into a target area Z3', wherein the shape and the width of the expanded target area are unchanged, and the length thereof is increased to 14 m. A gap between the signal transmitting apparatuses is unchanged. Six signal transmitting apparatuses P1', P2', P3', P4', P5' and P6' are arranged within the target area Z3' in total. Then, the judgment model W of the target area Z3 is also applicable to the target area Z3'. It is also possible to determine whether the object is the target area Z3' by selecting four wireless signals having the strongest intensity among the wireless signals that the object receives from the P1'-P6' and inputting the intensity values of the four wireless signals to the judgment model W.

In another embodiment, it is possible to compare the intensity values of N wireless signals that the object receives from different signal transmitting apparatuses with the acquired positive sample data, and when the similarity of the intensity values of the N wireless signals that the object receives from different signal transmitting apparatuses and certain group of positive sample data reaches a certain degree, it is determined that the object is within the target area, otherwise it is determined that the object is not in the target area.

Figure 3:
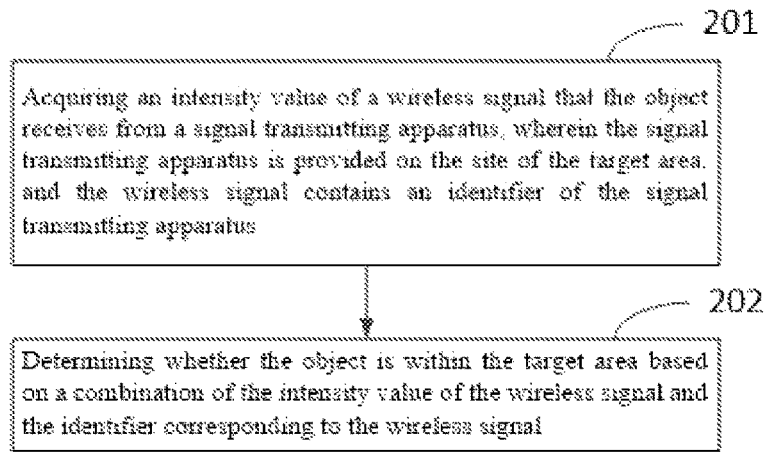
FIG. 3 illustrates a schematic flow diagram of a method for determining whether an object is within a target area provided by another embodiment of the present disclosure.

As illustrated in FIG. 3, a method for determining whether an object is within a target area provided by another embodiment of the present disclosure is described. The embodiment of FIG. 3 is similar to the embodiment of FIG. 1 except that, in the embodiment of FIG. 3, whether the object is within the target area is determined based on a combination of the intensity value of the wireless signal and an identifier of the corresponding signal transmitting apparatus. The method for determining whether the object is within the target area provided by the embodiment of FIG. 3 comprises the following steps 201-202.

In the step 201, an intensity value of a wireless signal that the object receives from a signal transmitting apparatus is acquired, wherein the signal transmitting apparatus is provided on the site of the target area and the wireless signal contains an identifier of the signal transmitting apparatus.

In the step 202, whether the object is within the target area is determined based on a combination of the intensity value of the wireless signal and the identifier corresponding to the wireless signal.

In an embodiment, the signal transmitting apparatuses are provided on the corners of the target area respectively.

In an embodiment, the parking area is in a shape of a rectangle, and the signal transmitting apparatuses are uniformly provided on center lines of the rectangle, the center line being a connection line of midpoints of two opposite sides of the rectangle.

In an embodiment, with respect to a plurality of signal transmitting apparatuses provided within one target area, any location within the target area is covered by the signals transmitted from at least two signal transmitting apparatuses. Each signal transmitting apparatus broadcasts a message to the periphery according to a certain period to form an electronic geo-fence that matches the target area. The intensity values of N wireless signals that the object receives from different signal transmitting apparatuses and the identifiers corresponding to the wireless signals are acquired. Whether the object is within the target area is determined based on a combination of the intensity values of the N wireless signals and the identifiers corresponding to the wireless signals, in which N≥2. Optionally, the N wireless signals are the N ones having the strongest intensity among the wireless signals that the object receives from the different signal transmitting apparatuses. If the object only receives the wireless signal from one signal transmitting apparatus, it is indicated that the object is not in the target area.

For example, four signal transmitting apparatuses are provided for a target area Z. The four signal transmitting apparatuses can be combined to realize the wireless coverage to the target area Z, and any location in the target areas Z is covered by the signals transmitted from at least two signal transmitting apparatuses. If the object receives wireless signals from the four signal transmitting apparatus, respectively, which are the wireless signal X1 received from the first signal transmitting apparatus, the wireless signal X2 received from the second signal transmitting apparatus, the wireless signal X3 received from the third signal transmitting apparatus and the wireless signal X4 received from the fourth signal transmitting apparatus respectively, the two signals having the strongest signal intensity are selected from the wireless signals X1 to X4, and whether the object is within the target area is determined based on a combination of the intensity values of the two wireless signals and identifiers corresponding to the wireless signals.

In an embodiment, it is possible to establish a judgment model by way of machine learning and training in advance, the judgment model taking the combination of the intensity value of the wireless signal received by the object and the identifier corresponding to the wireless signal as an input and whether the object is within the target area as an output.

The judgment model is obtained by way of training through previously acquired positive sample data and negative sample data.

A group of positive sample data is acquired for each position within the target area. For an object at a certain position within the target area, a group of positive sample data includes a combination of the intensity values of various wireless signals acquired by the object and identifiers corresponding to the wireless signals, or a group of positive sample data includes a combination of the intensity values of the N wireless signals having the strongest intensity acquired by the object and identifiers corresponding to the wireless signals.

A group of negative sample data is acquired for each position outside the target area. For an object at a certain position within the target area, a group of negative sample data includes a combination of the intensity values of various wireless signals acquired by the object and identifiers corresponding to the wireless signals, or a group of negative sample data includes a combination of the intensity values of the N wireless signals having the strongest intensity acquired by the object and identifiers corresponding to the wireless signals.

After the judgment model is formed, in the step 202, whether the object is within the target area can be determined based on the judgment model.

Since the embodiment of FIG. 3 takes consideration of the signal transmitting apparatuses corresponding to the wireless signals, the accuracy of judging whether the object is within the target area is higher, and therefore the embodiment of FIG. 3 is better applicable to the case where the signal transmitting apparatuses are not uniformly deployed within the target area.

The inventors have set up two signal transmitting apparatuses for the rectangular or elliptical target area upon actual detection, each signal transmitting apparatus being capable of independently covering the target area. The accuracy of judging whether the object is within the target area by the judgment model obtained by way of machine learning and training is over 90%.

In the above various embodiments, those skilled in the art can set a specific learning and training way to obtain a judgment model suitable for the target area according to the shape of the target area and the specific arrangement circumstances of a parking apparatus, all of which should fall within the scope of protection of the present disclosure.

According to the method for determining whether the object is within the target area provided by an embodiment of the present disclosure, whether the object is within the target area is determined directly using the intensity of the wireless signal received by the object, without performing positioning calculation on the object. If the object is positioned by way of GPS, the way of judging whether the object is within the target area according to the positioning result will be limited by low positioning accuracy and retardance of GPS. In addition, a GPS signal is also susceptible to obstructions. In contrast, the method for determining whether the object is within the target area provided by the embodiment of the present disclosure is more accurate and reliable.

In the embodiment of the method for determining whether the object is within the target area, the object may be a vehicle, and the target area may be a parking area. Therefore, an embodiment of the present disclosure further provides a parking management method.

A parking management method provided according to an embodiment of the present disclosure comprises the following steps:

Acquiring an intensity value of a wireless signal received by the vehicle from a signal transmitting apparatus provided on the site of a parking area; and Determining whether the vehicle is in the parking area based on the intensity value of the wireless signal.

Optionally, any location within the parking area is covered by the signals transmitted from at least two wireless transmitting apparatuses. The intensity values of N wireless signals received by the vehicle from different signal transmitting apparatuses are acquired, in which N≥2. Whether the vehicle is in the parking area is determined based on the intensity values of the N wireless signals.

Optionally, whether the vehicle is in the parking area is determined based on a judgment model, wherein the judgment model is trained by using positive sample data and negative sample data in advance, the positive sample data comprising intensity values of wireless signals acquired from vehicles at various positions within the parking area, and the negative sample data comprising intensity values of wireless signals acquired from vehicles at various positions outside the parking area.

When the acquired and trained sample data is richer, the more accurate the judgment model will be, the more accurate the judgment will be, thereby forming an electronic geo-fence that can effectively determine whether the user has parked the vehicle normatively in the parking area.

The parking management method provided by the embodiment of the present disclosure will be described below with reference to a specific example.

In the embodiment of the present disclosure, the vehicle itself has a wireless signal receiving function, for example, the vehicle is provided with a Bluetooth communication unit or a WIFI communication unit. When the vehicle is set to a parked state, a wireless signal receiving apparatus of the vehicle receives a wireless signal from a signal transmitting apparatus provided on the site of the parking area with a period of window time. When a vehicle's lock is locked, the vehicle is set to a parked state.

Figure 4:
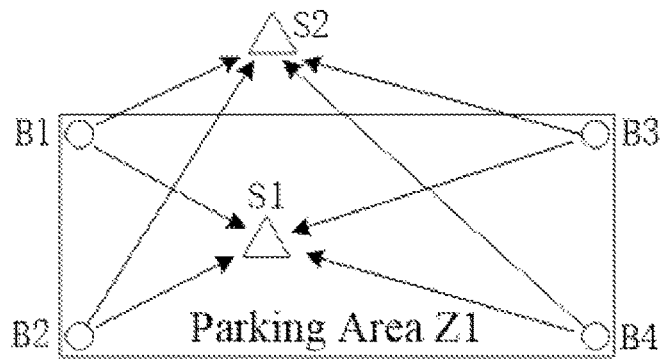
FIG. 4 illustrates a schematic diagram of a deployment way of signal transmitting apparatuses provided by an embodiment of the present disclosure.

As shown in FIG. 4, the parking area Z1 is in a shape of a rectangle, and signal transmitting apparatuses, which are B1, B2, B3 and B4 respectively, are provided on four corners of the parking area Z1 respectively.

When the user parks the vehicle at a position S1 and locks the vehicle, the vehicle is set to the parked state, and the wireless signal receiving apparatus of the vehicle receives wireless signals from the signal transmitting apparatuses B1 to B4, respectively. The vehicle transmits the intensity values of the wireless signals received from the signal transmitting apparatuses B1 to B4 to a server, and the server determines that the vehicle is in the parking area based on the intensity values of the wireless signals. The server may transmit a prompt message "vehicle has been parked correctly" to a user's terminal, such as a user's phone.

When the user parks the vehicle at a position S2 and locks the vehicle, the vehicle is set to the parked state, and the wireless signal receiving apparatus of the vehicle receives wireless signals from the signal transmitting apparatuses B1 to B4, respectively. The vehicle transmits the intensity values of the wireless signals received from the signal transmitting apparatuses B1 to B4 to a server, and the server determines that the vehicle is not in the parking area based on the intensity values of the wireless signals. The server may transmit a prompt message "the vehicle is not parked correctly, please park the vehicle in the parking area" to the user's terminal.

When it is determined that the vehicle is not parked in the parking area, the server can also send a prompt message to the vehicle, and the vehicle prompts the user that the vehicle is not parked correctly by way of a flashing light or a voice alarm.

In other embodiments, whether the vehicle is in the parking area may be determined by the vehicle itself. When the vehicle determines that it has not been parked in the parking area, the vehicle prompts the user that the vehicle is not parked correctly by way of a flashing light or a voice alarm; or the vehicle sends a prompt message "the vehicle is not parked correctly, please park the vehicle in the parking area" to the user's terminal.

In other embodiments, the vehicle transmits the intensity value of the wireless signal to the user's terminal, and the user's terminal determines whether the vehicle is in the parking area and displays the prompt message based on the judgment result.

Figure 5:
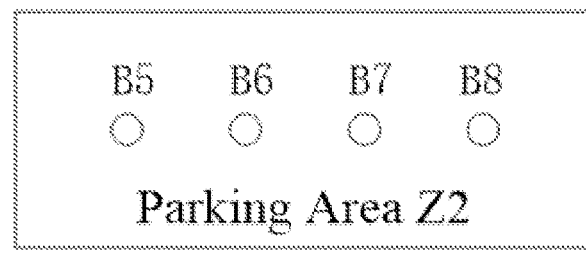
FIG. 5 illustrates a schematic diagram of a deployment way of signal transmitting apparatuses provided by another embodiment of the present disclosure.

In another embodiment, as shown in FIG. 5, the parking area Z2 is in a shape of a rectangle, and five signal transmitting apparatuses, which are B5, B6, B7 and B8 respectively, are uniformly provided on center lines of the rectangle, the center line being a connection line of midpoints of two opposite sides of the rectangle.

Similar to the previous embodiment, another embodiment of the present disclosure further provides a parking management method. The parking management method comprises the following steps: acquiring an intensity value of a wireless signal received by the vehicle from a signal transmitting apparatus provided on the site of a parking area, wherein the wireless signal contains an identifier of the signal transmitting apparatus; and determining whether the object is within the target area based on a combination of the intensity value of the wireless signal and the identifier corresponding to the wireless signal.

Optionally, any location within the parking area is covered by the signals transmitted from at least two wireless transmitting apparatuses. The intensity values of N wireless signals received by the vehicle from different signal transmitting apparatuses are acquired, in which N≥2. Whether the vehicle is in the parking area is determined based on a combination of the intensity values of the N wireless signals and the identifiers corresponding to the wireless signals.

Optionally, whether the vehicle is in the parking area is determined based on a judgment model, wherein the judgment model is trained by using positive sample data and negative sample data in advance, the positive sample data comprising a combination of intensity values of wireless signals acquired from vehicles at various position within the parking area and identifiers corresponding to the wireless signals, and the negative sample data comprising a combination of intensity values of wireless signals acquired from vehicles at various positions outside the parking area and identifiers corresponding to the wireless signals.

Similar to the previous embodiment, parking management may be performed by any one of a server, a vehicle, and a user's terminal.

According to the parking management method provided by the embodiment of the present disclosure, whether the vehicle is in the parking area is determined directly using the intensity value of the wireless signal received by the vehicle, without performing positioning calculation on the object.

Optionally, according to the parking management method provided by the embodiment of the present disclosure, an electronic geo-fence can be tightly fitted to the parking area to accurately determine whether a parking position is within the parking area. In addition, any position within the parking area may be covered by the signals transmitted from at least three or more signal transmitting apparatuses. When one signal transmitting apparatus has a fault or the signal is disturbed, the vehicle can still search for signals from other signal transmitting apparatuses, and therefore certain robustness is achieved.

Alternatively, the parking management method provided by the embodiment of the present disclosure does not depend on the latitude and longitude of a positioning point, and is thus more suitable for deployment in a narrow zone of an urban street. The signal transmitting apparatuses may be distributed according to a field shape without the need to acquire the latitudes and longitudes of the signal transmitting apparatuses. Therefore, the signal transmitting apparatuses suffer less deployment constraints.

An embodiment of the present disclosure provides a parking management device, comprising a memory and a processor, wherein the memory is used for storing instructions, the instructions being used for controlling the processor to operate to execute any of the preceding methods for determining whether the object is within the target area. Optionally, the parking management device may be at least one of a vehicle, a mobile terminal and a server.

The parking management method may be implemented by those skilled in the art by way of hardware, software or a combination of software and hardware. Based on the same inventive concept, an embodiment of the present disclosure further provides a parking management device and a parking management system to perform the aforementioned parking management method.

Figure 6:
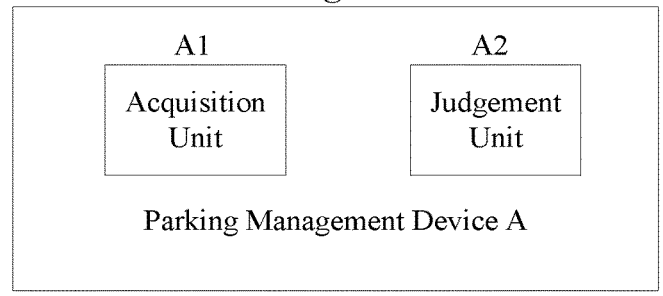
FIG. 6 is a block diagram of a parking management device provided by an embodiment of the present disclosure.

As shown in FIG. 6, the parking management device A comprises a data acquisition unit A1 and a judgment unit A2.

The data acquisition unit A1 is used for acquiring an intensity value of a wireless signal received by the vehicle from a signal transmitting apparatus provided on the site of the parking area.

The judging unit A2 is used for determining whether the vehicle is in the parking area based on the intensity value of the wireless signal.

Optionally, the data acquisition unit A1 is used for acquiring the intensity values of N wireless signals received by the vehicle from different signal transmitting apparatuses, in which N≥2. The judgment unit A2 is used for determining whether the vehicle is in the parking area based on the intensity values of the N wireless signals.

Optionally, the N wireless signals are the N ones having the strongest intensity among the wireless signals received by the vehicle from the different signal transmitting apparatuses.

Optionally, the judgment unit A2 is used for determining the vehicle is in the parking area based on a judgment model, wherein the judgment model is trained by using positive sample data and negative sample data in advance, the positive sample data comprising intensity values of wireless signals acquired from vehicles at various positions within the parking area, and the negative sample data comprising intensity values of wireless signals acquired from vehicles at various positions outside the parking area.

Optionally, the wireless signal contains an identifier of the signal transmitting apparatus. The judgment unit A2 is used for determining whether the vehicle is in the parking area based on a combination of the intensity value of the wireless signal and the identifier corresponding to the wireless signal.

Optionally, the data acquisition unit A1 is used for acquiring the intensity values of N wireless signals received by the vehicle from different signal transmitting apparatuses and identifiers corresponding to the wireless signals, in which N≥2. The judgment unit A2 is used for determining whether the vehicle is in the parking area based on the a combination of the intensity values of the N wireless signals and the identifiers corresponding to the wireless signals.

Optionally, the N wireless signals are the N ones having the strongest intensity among the wireless signals received by the vehicle from the different signal transmitting apparatuses.

Optionally, the judgment unit A2 is used for determining whether the vehicle is in the parking area based on a judgment model, wherein the judgment model is trained by using positive sample data and negative sample data in advance, the positive sample data comprising a combination of intensity values of wireless signals acquired from vehicles at various positions within the parking area and identifiers corresponding to the wireless signals, and the negative sample data comprising a combination of intensity values of wireless signals acquired from vehicles at various positions outside the parking area and identifiers corresponding to the wireless signals.

Optionally, the parking management device further comprises a parking prompting unit which is used for providing a prompt message related to vehicle parking when the vehicle is not in the parking area. If the server is the parking management device, the parking prompting unit sends a prompt message to the user's terminal or the vehicle to guide the user to park the vehicle normatively when it is determined that the vehicle is not in the parking area. If the server is the parking management device, the parking prompting unit sends a prompt message to the user's terminal to guide the user to park the vehicle normatively when it is determined that the vehicle is not in the parking area; or the parking prompting unit of the vehicle emits a light or a voice directly to prompt the user. In another embodiment, the user's terminal is the parking management device.

The embodiment of the present disclosure provides an electronic device which comprises any of the preceding parking management devices.

Optionally, the electronic device is at least one of a vehicle, a mobile terminal and a server.

Figure 7:
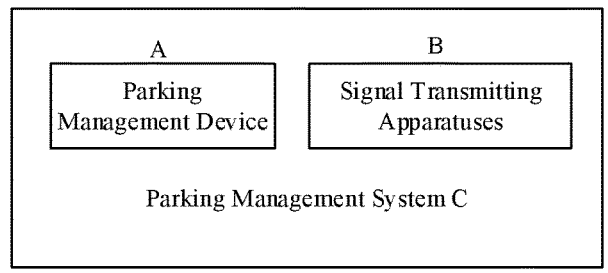
FIG. 7 is a block diagram of a parking management system provided by an embodiment of the present disclosure.

As shown in FIG. 7, the parking management system C comprises the parking management device A according to any of the preceding parking management devices and the signal transmitting apparatuses B used for defining the parking area.

Optionally, the parking management device A is located in at least one of a vehicle, a mobile terminal and a server.

Optionally, the signal transmitting apparatuses B are provided on the corners of the parking area respectively.

Optionally, the parking area is in a shape of a rectangle, and the signal transmitting apparatuses B are uniformly provided on center lines of the rectangle, the center line being a connection line of midpoints of two opposite sides of the rectangle.

Optionally, the parking area is in a shape of a rectangle or an ellipse, and any location within the parking area is covered by the signals transmitted from at least two signal transmitting apparatuses B.

Figure 8:
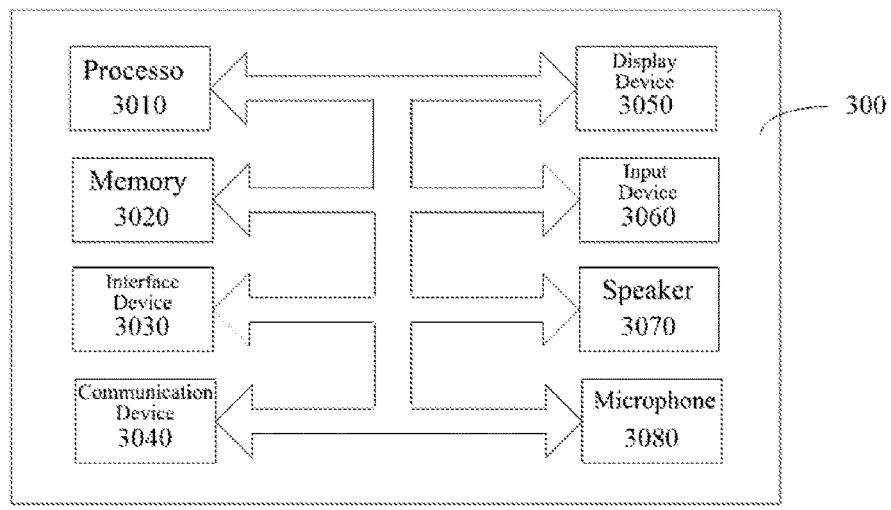
FIG. 8 is a block diagram of hardware configuration of a parking management device provided by an embodiment of the present disclosure.

FIG. 8 is a block diagram displaying an example which can be used to implement hardware configuration of a parking management device according to an embodiment of the present disclosure. The parking management device 300 comprises a processor 3010, a memory 3020, an interface device 3030, a communication device 3040, a display device 3050, an input device 3060, a speaker 3070, a microphone 3080, and the like.

The memory 3020 is used to store instructions that are used to control the processor 3010 to operate to execute the parking management method according to any one of the preceding claims.

The processor 3010 may be, for example, a central processing unit CPU, a micro-processing unit MPU, or the like. The memory 3020 includes, for example, a ROM (Read Only Memory), a RAM (Random Access Memory), a non-volatile memory such as a hard disk, and the like. The interface device 3030 includes, for example, a USB interface, a headphone interface, and the like. The communication device 3040 is, for example, available for wired or wireless communication. The display device 3050 is, for example, a liquid crystal display, a touch screen, and the like. The input device 3060 may include, for example, a touch screen, a keyboard, and the like. The user can input/output voice messages via the speaker 3070 and the microphone 3080.

The parking management device shown in FIG. 8 is merely illustrative and is in no way intended to limit the present disclosure and its application or use. It will be understood by those skilled in the art that, although a plurality of apparatuses are shown in FIG. 8, the disclosure may relate only to a part of the apparatuses. Those skilled in the art will be able to design instructions in accordance with the solution disclosed by the present disclosure, and how to operate the processor under the control of the instructions is well-known in the art and will not be described in detail herein.

According to the parking management device and the parking management system provided by the embodiments of the present disclosure, whether the vehicle is in the parking area is determined directly using the intensity value of the wireless signal received by the vehicle, without performing positioning calculation on the object, which is accurate and reliable.

In the present embodiment, the technical solutions for vehicle control are provided in the following aspects.

According to the first aspect, there is provided a method for determining whether an object is within a target area, comprising: acquiring an intensity value of a wireless signal that an object receives from a signal transmitting apparatus which is provided on the site of a target area; and determining whether the object is within the target area based on the intensity value of the wireless signal.

According to the second aspect, there is provided the method according to the first aspect, wherein the wireless signal contains an identifier of the wireless transmitting apparatus; determining whether the object is within the target area based on a combination of the intensity value of the wireless signal and the identifier corresponding to the wireless signal.

According to the third aspect, there is provided the method according to the first aspect or the second aspect, wherein the target area is circular, the signal transmitting apparatus is provided in the center of the target area, and the signal transmitted from the apparatus covers the target area.

According to the forth aspect, there is provided the method according to the first aspect or the second aspect, wherein any location within the target area is covered by the signals transmitted from at least two wireless transmitting apparatuses; the intensity values of N wireless signals that the object receives from different signal transmitting apparatuses are acquired, in which N 2; whether the object is within the target area is determined based on the intensity values of the N wireless signals or based on a combination of the intensity values of the N wireless signals and identifiers corresponding to the wireless signals.

According to the fifth aspect, there is provided the method according to the fourth aspect, wherein the N wireless signals are the N ones having the strongest intensity among the wireless signals that the object receives from the different signal transmitting apparatuses.

According to the sixth aspect, there is provided the method according to any one of the first aspect to the second and the fourth aspect to the fifth aspect, wherein the signal transmitting apparatuses are provided at corners of the target area respectively.

According to the seventh aspect, there is provided the method according to any one of the first aspect to the second and the fourth aspect to the fifth aspect, wherein the target area is in a shape of a rectangle, and the signal transmitting apparatuses are uniformly provided on center lines of the rectangle, the center line being a connection line of midpoints of two opposite sides of the rectangle.

According to the eighth aspect, there is provided the method according to the first aspect wherein whether the object is within the target area is determined based on a judgment model, wherein the judgment model is trained in advance by using positive sample data and negative sample data, the positive sample data comprising intensity values of wireless signals acquired by objects at various positions within the target area, and the negative sample data comprising intensity values of wireless signals acquired by objects at various positions outside the target area.

According to the ninth aspect, there is provided the method according to the second aspect wherein whether the object is within the target area is determined based on a judgment model, wherein the judgment model is trained in advance by using positive sample data and negative sample data, the positive sample data comprising a combination of intensity values of wireless signals acquired by objects at various positions within the target area and identifiers which correspond to the wireless signals, and the negative sample data comprising a combination of intensity values of wireless signals acquired by objects at various positions outside the target area and identifiers which correspond to the wireless signals.

According to the tenth aspect, there is provided the method according to the first aspect to the ninth aspect, wherein the object is a vehicle, and the target area is a parking area.

According to the eleventh aspect, there is provided the method according to the tenth aspect, wherein a message about vehicle parking is provided when the vehicle is not within the parking area.

According to the twelfth aspect, there is provided a parking management device, comprising a data acquisition unit and a judgment unit; wherein the data acquisition unit is used for acquiring an intensity value of a wireless signal that a vehicle receives from a signal transmitting apparatus which is provided on the site of a parking area; and the judging unit is used for determining whether the vehicle is within the parking area based on the intensity value of the wireless signal.

According to the thirteenth aspect, there is provided the device according to the twelfth aspect, wherein the wireless signal contains an identifier of the signal transmitting apparatus; the judging unit is used for determining whether the vehicle is within the parking area, based on a combination of the intensity value of the wireless signal and the identifier corresponding to the wireless signal.

According to the fourteenth aspect, there is provided the device according to the twelfth aspect or the thirteenth aspect to the thirteenth aspect wherein, the data acquisition unit is used for acquiring the intensity values of N wireless signals that the vehicle receives from different signal transmitting apparatuses, in which N 2; the judgment unit is used for determining whether the vehicle is within the parking area based on the intensity values of the N wireless signals or based on a combination of the intensity values of the N wireless signals and identifiers corresponding to the wireless signals.

According to the fifteenth aspect, there is provided the device according to the fourteenth aspect, wherein N wireless signals are the N ones having the strongest intensity among the wireless signals that the vehicle receives from the different signal transmitting apparatuses.

According to the sixteenth aspect of the present disclosure, there is provided the device according to the twelfth aspect, wherein the judgment unit is used for determining whether the vehicle is within the parking area based on a judgment model, wherein the judgment model is trained in advance by using positive sample data and negative sample data, the positive sample data comprising intensity values of wireless signals acquired by vehicles at various positions within the parking area, and the negative sample data comprising intensity values of wireless signals acquired by vehicles at various positions outside the parking area.

According to the seventeenth aspect, there is provided the device according to the thirteenth aspect, wherein the judgment unit is used for determining whether the vehicle is within the parking area based on a judgment model, wherein the judgment model is trained in advance by using positive sample data and negative sample data, the positive sample data comprising a combination of intensity values of wireless signals acquired by vehicles at various positions within the parking area and identifiers which correspond to the wireless signals, and the negative sample data comprising a combination of intensity values of wireless signals acquired by vehicles at various positions outside the parking area and identifiers which correspond to the wireless signals.

According to the eighteenth aspect, there is provided the device according to any one of the twelfth aspect to the seventeenth aspect, further comprising a parking prompting unit which is used for providing a prompt message when the vehicle is not within the parking area.

According to the nineteenth aspect, there is provided a parking management system, comprising the parking management device according to any of the twelfth aspect to the eighteenth aspect and the signal transmitting apparatuses used for defining the parking area.

According to the twentieth aspect, there is provided the system according to the nineteenth aspect, wherein the parking management device is located in at least one of the vehicle, a mobile terminal and a server.

According to the twenty first aspect of the present disclosure, there is provided the system according to the nineteenth aspect or the twentieth aspect, wherein the signal transmitting apparatuses are provided at corners of the parking area respectively.

According to the twenty second aspect of the present disclosure, there is provided the system according to the nineteenth aspect or the twentieth aspect, wherein the parking area is in a shape of a rectangle, and the signal transmitting apparatuses are uniformly provided on center lines of the rectangle, the center line being a connection line of midpoints of two opposite sides of the rectangle.

According to the twenty third aspect of the present disclosure, there is provided the system according to any of the nineteenth aspect to the twentieth second aspect, wherein the parking area is in a shape of a rectangle or an ellipse, and any location within the parking area is covered by the signals transmitted from at least two signal transmitting apparatuses.

According to the twenty forth aspect of the present disclosure, there is provided an electronic device, comprising the parking management device according to any of the twelfth aspect to the eighteenth aspect.

According to the twenty fifth aspect of the present disclosure, there is provided the device according to the twenty forth aspect, wherein the electronic device is at least one of the vehicle, a mobile terminal and a server.

According to the twenty sixth aspect, there is provided a parking management device, comprising a memory and a processor, wherein the memory is used for storing instructions, the instructions being used for controlling the processor to operate to execute the method for determining whether the object is within the target area according to any of the first aspect to the eleventh aspect.

According to the twenty seventh aspect, there is provided the device according to the twenty sixth aspect, wherein the parking management device is at least one of the vehicle, a mobile terminal and a server.

The present disclosure relates in various aspects to a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The attached claims are therefore intended to be construed and interpreted in the context of the foregoing disclosure, including such variations, modifications, and alternative embodiments as will readily suggest themselves to those of ordinary skill in the art based on the foregoing disclosure.

What is claimed is:

1. A method for determining whether an object is within a target area, comprising the following steps:
   acquiring an intensity value of a wireless signal that an object receives from a signal transmitting apparatus which is provided on the site of a target area; and
   determining whether the object is within the target area based on the intensity value of the wireless signal,
   wherein whether the object is within the target area is determined based on a judgment model, and
   wherein the judgment model is trained in advance by using positive sample data and negative sample data, the positive sample data comprising intensity values of wireless signals acquired by objects at various positions within the target area, and the negative sample data comprising intensity values of wireless signals acquired by objects at various positions outside the target area.

2. The method according to claim 1, wherein the wireless signal contains an identifier of the wireless transmitting apparatus;
   determining whether the object is within the target area based on a combination of the intensity value of the wireless signal and the identifier corresponding to the wireless signal.

3. The method according to claim 1, wherein the target area is circular, the signal transmitting apparatus is provided in the center of the target area, and the signal transmitted from the apparatus covers the target area.

4. The method according to claim 2, wherein any location within the target area is covered by the signals transmitted from at least two wireless transmitting apparatuses;
   the intensity values of N wireless signals that the object receives from different signal transmitting apparatuses are acquired, in which $N \geq 2$;
   whether the object is within the target area is determined based on the intensity values of the N wireless signals or based on a combination of the intensity values of the N wireless signals and identifiers corresponding to the wireless signals.

5. The method according to claim 4, wherein the N wireless signals are the N ones having the strongest intensity among the wireless signals that the object receives from the different signal transmitting apparatuses.

6. The method according to claim 1, wherein the signal transmitting apparatuses are provided at corners of the target area respectively.

7. The method according to claim 1, wherein the target area is in a shape of a rectangle, and the signal transmitting apparatuses are uniformly provided on center lines of the rectangle, the center line being a connection line of midpoints of two opposite sides of the rectangle.

8. The method according to claim 1, wherein the object is a vehicle, and the target area is a parking area.

9. The method according to claim 8, wherein a message about vehicle parking is provided when the vehicle is not within the parking area.

10. A parking management device, comprising a data acquisition unit and a judgment unit;
    the data acquisition unit is used for acquiring an intensity value of a wireless signal that a vehicle receives from a signal transmitting apparatus which is provided on the site of a parking area; and
    the judgment unit is used for determining whether the vehicle is within the parking area based on the intensity value of the wireless signal,
    wherein the judgment unit is used for determining whether the vehicle is within the parking area based on a judgment model,
    wherein the judgment model is trained in advance by using positive sample data and negative sample data, the positive sample data comprising intensity values of wireless signals acquired by vehicles at various positions within the parking area, and the negative sample data comprising intensity values of wireless signals acquired by vehicles at various positions outside the parking area.

11. The device according to claim 10, wherein the wireless signal contains an identifier of the signal transmitting apparatus;
    the judgment unit is used for determining whether the vehicle is within the parking area, based on a combination of the intensity value of the wireless signal and the identifier corresponding to the wireless signal.

12. The device according to claim 11, wherein, the data acquisition unit is used for acquiring the intensity values of N wireless signals that the vehicle receives from different signal transmitting apparatuses, in which $N \geq 2$;

the judgment unit is used for determining whether the vehicle is within the parking area based on the intensity values of the N wireless signals or based on a combination of the intensity values of the N wireless signals and identifiers corresponding to the wireless signals.

13. The device according to claim 12, wherein N wireless signals are the N ones having the strongest intensity among the wireless signals that the vehicle receives from the different signal transmitting apparatuses.

14. The device according to claim 10, further comprising a parking prompting unit which is used for providing a prompt message when the vehicle is not within the parking area.

15. A parking management device, wherein comprising a memory and a processor, the memory is used for storing instructions, the instructions being used for controlling the processor to operate to execute the method for determining whether the object is within the target area according to claim 1.

16. The parking management device according to claim 15, wherein the parking management device is at least one of the vehicle, a mobile terminal and a server.

* * * * *